United States Patent
Chang

(10) Patent No.: US 11,513,564 B2
(45) Date of Patent: Nov. 29, 2022

(54) CASING STRUCTURE AND MANUFACTURING METHOD THEREOF

(71) Applicant: Chin-Hsien Chang, Taipei (TW)

(72) Inventor: Chin-Hsien Chang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 306 days.

(21) Appl. No.: 16/807,027

(22) Filed: Mar. 2, 2020

(65) Prior Publication Data

US 2020/0293091 A1  Sep. 17, 2020

Related U.S. Application Data

(60) Provisional application No. 62/817,516, filed on Mar. 12, 2019.

(51) Int. Cl.
| | | |
|---|---|---|
| *H05K 7/20* | (2006.01) | |
| *G06F 1/16* | (2006.01) | |
| *B29C 45/14* | (2006.01) | |
| *B29L 31/34* | (2006.01) | |
| *B29K 705/00* | (2006.01) | |

(52) U.S. Cl.
CPC ...... *G06F 1/1656* (2013.01); *B29C 45/14336* (2013.01); *B29C 45/14467* (2013.01); *B29K 2705/00* (2013.01); *B29L 2031/3481* (2013.01)

(58) Field of Classification Search
CPC .............................. G06F 1/1633; G06F 1/1656
See application file for complete search history.

(56) References Cited

U.S. PATENT DOCUMENTS

| | | | |
|---|---|---|---|
| 7,385,806 B2 * | 6/2008 | Liao | G06F 1/1616 361/679.01 |
| 8,205,305 B2 | 6/2012 | Wang et al. | |
| 8,310,825 B2 * | 11/2012 | Schlesener | G06F 1/1656 343/702 |
| 10,599,193 B2 * | 3/2020 | Li | H01Q 1/44 |
| 2010/0178957 A1 * | 7/2010 | Chen | G06F 1/1626 455/565 |
| 2011/0115735 A1 * | 5/2011 | Lev | H01Q 1/2266 345/173 |
| 2012/0145725 A1 * | 6/2012 | Hsu | G06F 1/182 204/192.1 |
| 2015/0125636 A1 * | 5/2015 | Chan | C25D 11/04 428/408 |
| 2015/0313045 A1 * | 10/2015 | Jin | H05K 9/0081 361/748 |

(Continued)

FOREIGN PATENT DOCUMENTS

| | | |
|---|---|---|
| CN | 208040904 | 11/2018 |
| CN | 208112692 | 11/2018 |

(Continued)

*Primary Examiner* — Anthony Q Edwards
(74) *Attorney, Agent, or Firm* — JCIPRNET

(57) ABSTRACT

A casing structure including a plastic casing, at least one metal component, and a conductive layer is provided. The at least one metal component is disposed on the plastic casing, and at least one side surface of the at least one metal component is covered by the plastic casing. The conductive layer is disposed on the metal component and extends to the plastic casing. In addition, a manufacturing method of the casing structure is also provided.

5 Claims, 4 Drawing Sheets

(56) References Cited

U.S. PATENT DOCUMENTS

2015/0346771 A1* 12/2015 Siddiqui ............... F16B 11/002
　　　　　　　　　　　　　　　　　　　　403/409.1
2021/0004047 A1*　1/2021　Cheng .................. G06F 1/1601
2021/0243925 A1*　8/2021　Ramasamy .......... H01Q 1/2266

FOREIGN PATENT DOCUMENTS

TW　　　M471736　　　2/2014
TW　　　M541586　　　5/2017

* cited by examiner

CASING STRUCTURE AND MANUFACTURING METHOD THEREOF

CROSS-REFERENCE TO RELATED APPLICATION

This application claims the benefit of U.S. provisional application Ser. No. 62/817,516, filed on Mar. 12, 2019. The entirety of the above-mentioned patent application is hereby incorporated by reference herein and made a part of this specification.

BACKGROUND

Technical Field

The disclosure relates to a casing structure and a manufacturing method thereof, and more particularly, to a casing structure including a metal component and a manufacturing method of the casing structure.

Description of Related Art

In order to ensure good electro-magnetic compatibility (EMC) of electronic apparatuses, some of the electronic apparatuses are equipped with metal components disposed at their plastic casings, and conductive layers occupying a large area are formed at the plastic casings through sputtering. The metal components are connected to the conductive layers, and the electronic devices in the plastic casings are grounded to the metal components.

Generally, the metal components are connected to the conductive layers by conductive tapes. However, the adhesion of the conductive tapes may be weak or inaccurate due to human errors. If the conductive layers are expected to be directly connected to the metal components through covering both the metal components and the plastic casings, the conductive layers are likely to be disconnected at the junction because the junction between the metal components and the plastic casings is not coplanar. As a result, the metal components cannot be reliably connected to the entire conductive layers occupying the large area.

SUMMARY

The disclosure provides a casing structure and a manufacturing method thereof, whereby a metal component may be reliably connected to an entire conductive layer occupying a large area.

According to an embodiment of the disclosure, a casing structure including a plastic casing, at least one metal component, and a conductive layer is provided. The at least one metal component is disposed on the plastic casing, and at least one side surface of the at least one metal component is covered by the plastic casing. The conductive layer is disposed on the at least one metal component and extended to the plastic casing.

In an embodiment of the disclosure, the at least one metal component is disposed on a surface of the plastic casing, the at least one side surface of the metal component adjoins the surface of the plastic casing, the plastic casing has at least one extension wall, and the at least one extension wall extends from the surface of the plastic casing and covers the at least one side surface of the at least one metal component.

In an embodiment of the disclosure, the at least one side surface of the at least one metal component is perpendicular to the surface of the plastic casing.

In an embodiment of the disclosure, a top surface of the at least one extension wall adjoins a top surface of the at least one metal component, and the top surface of the at least one extension wall is level with the top surface of the at least one metal component.

In an embodiment of the disclosure, the conductive layer covers the top surface of the at least one extension wall and the top surface of the at least one metal component.

In an embodiment of the disclosure, the at least one metal component is located at a corner area of the plastic casing.

According to an embodiment of the disclosure, a manufacturing method of a casing structure is provided and includes following steps. At least one metal component is provided. A plastic casing is formed on the at least one metal component, so that at least one side surface of the at least one metal component is covered by the plastic casing. A conductive layer is formed on the at least one metal component, and the conductive layer extends to the plastic casing.

In an embodiment of the disclosure, the step of forming the plastic casing includes an in-mold injection process.

In an embodiment of the disclosure, the step of forming the conductive layer includes a sputtering process.

In an embodiment of the disclosure, the manufacturing method of the casing structure includes adjoining at least one side surface of the at least one metal component and a surface of the plastic casing, and at least one extension wall of the plastic casing is enabled to extend from the surface of the plastic casing and cover the at least one side surface of the at least one metal component.

In an embodiment of the disclosure, the manufacturing method of the casing structure includes enabling the at least one side surface of the at least one metal component to be perpendicular to the surface of the plastic casing.

In an embodiment of the disclosure, the manufacturing method of the casing structure includes adjoining a top surface of the at least one extension wall and a top surface of the at least one metal component, and enabling the top surface of the at least one extension wall to be level with the top surface of the at least one metal component.

In an embodiment of the disclosure, the manufacturing method of the casing structure includes covering the top surface of the at least one extension wall and the top surface of the at least one metal component by the conductive layer.

In an embodiment of the disclosure, the manufacturing method of the casing structure includes disposing the at least one metal component at a corner area of the plastic casing.

As provided above, in one or more embodiments of the disclosure, the plastic casing is set to cover the side surface of the metal component, so that the metal component and the plastic casing are coplanar at the junction therebetween, whereby the conductive layer may be protected from being broken at the junction of the metal component and the plastic casing due to the structural height difference. As such, the metal component may be reliably connected to the entire conductive layer occupying a large area.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
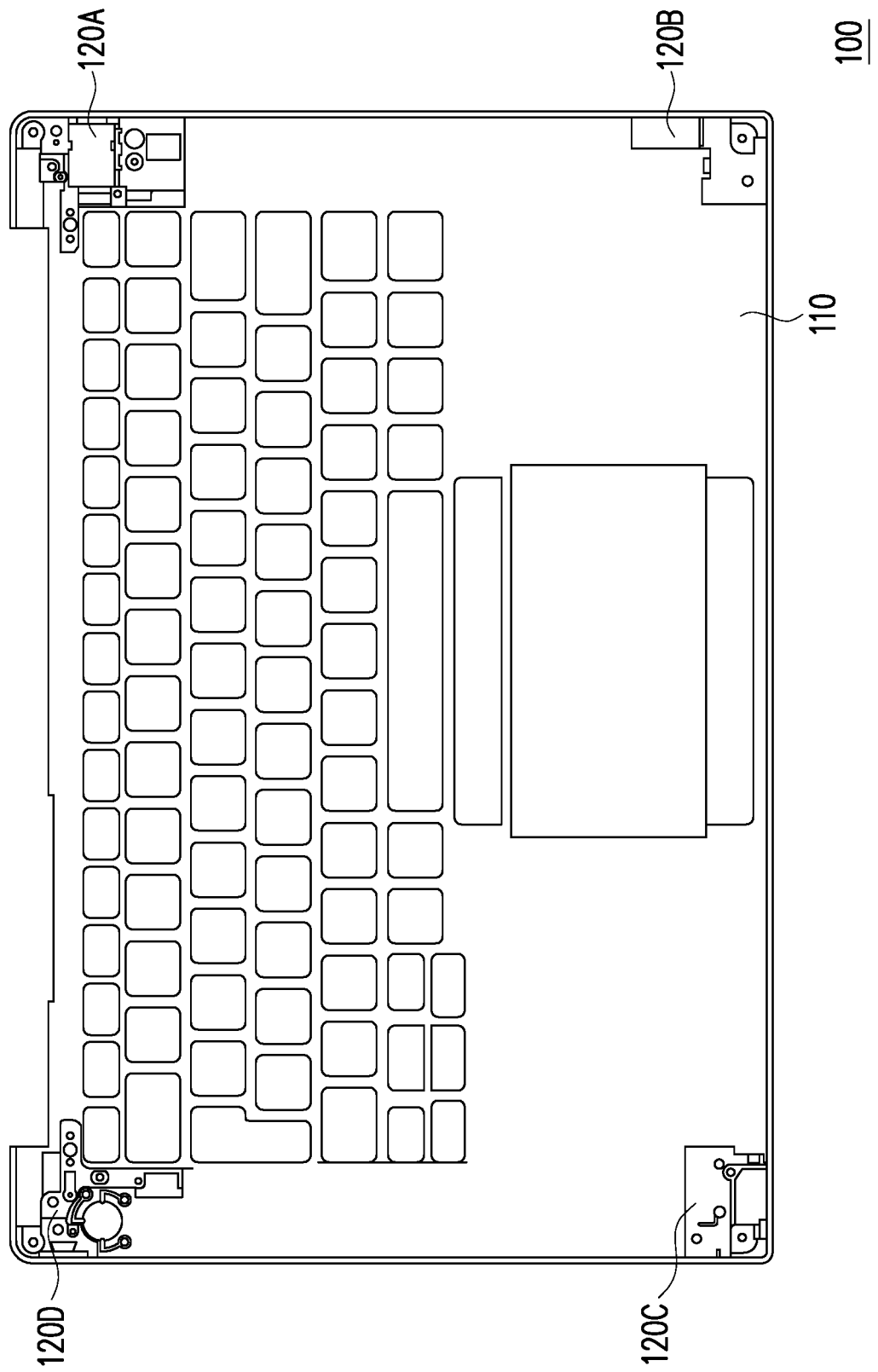
FIG. 1 is a bottom view of a casing structure according to an embodiment of the disclosure.

FIG. 1 is a bottom view of a casing structure according to an embodiment of the disclosure. With reference to FIG. 1, a casing structure 100 provided in this embodiment includes a plastic casing 110 and at least one metal component (shown as a plurality of metal components 120A, 120B, 120C, and 120D). These metal components 120A, 120B, 120C, and 120D are, for instance, iron components disposed on the plastic casing 110 and located respectively in corner areas of the plastic casing 110 not only for increasing a drop strength of the corner areas of the casing structure 100 but also for being assembled to other components or casings, so as to improve the assembly reliability. In addition, the casing structure 100 may serve as a casing of an electronic apparatus (such as a notebook computer or other types of electronic apparatuses), and the metal components 120A, 120B, 120C, and 120D may serve to improve EMC of the electronic apparatus. The metal component 120A is taken as an example below for further explanation.

Figure 2:
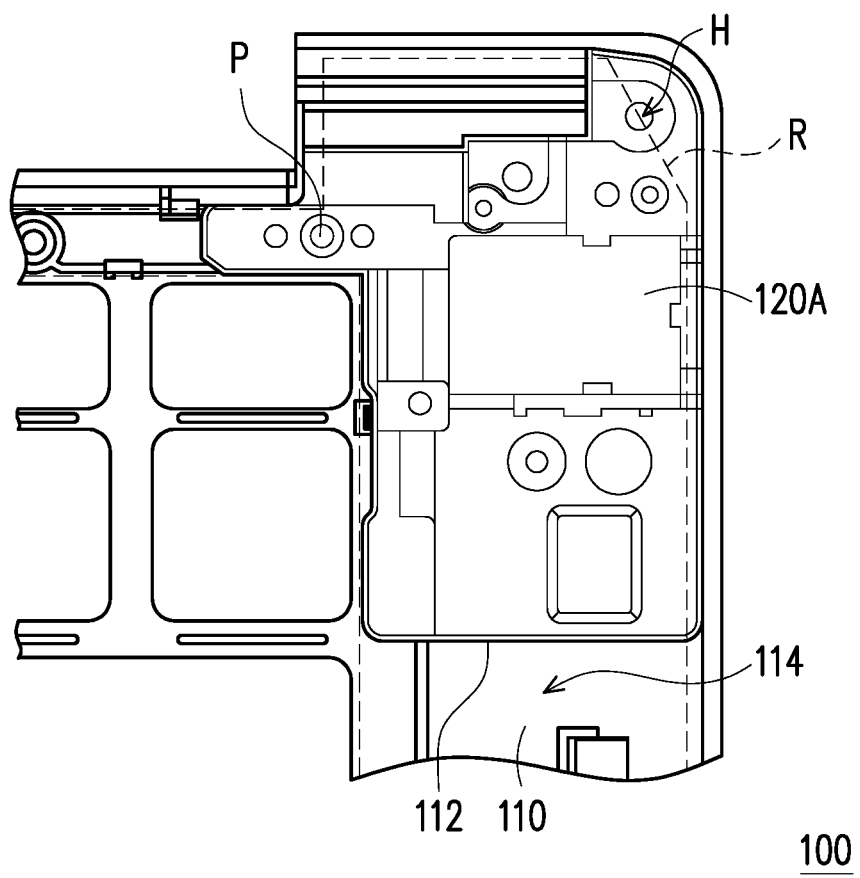
FIG. 2 is a partial enlarged view of the casing structure depicted in FIG. 1.
Figure 3:
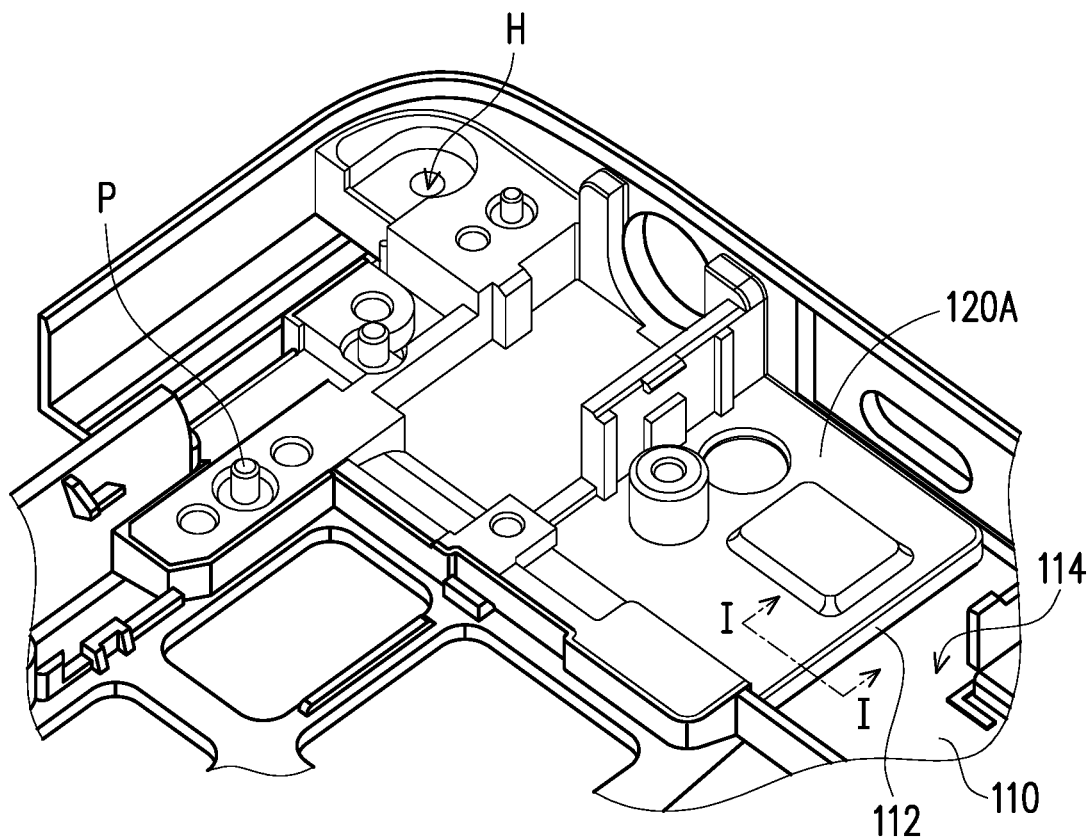
FIG. 3 is a perspective view of the casing structure depicted in FIG. 2.
Figure 4:
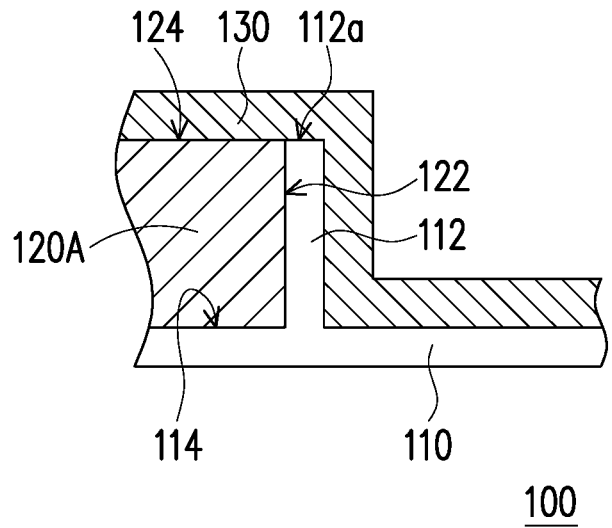
FIG. 4 is a cross-sectional view of the casing structure depicted in FIG. 3 along a line I-I.

FIG. 2 is a partial enlarged view of the casing structure depicted in FIG. 1. FIG. 3 is a perspective view of the casing structure depicted in FIG. 2. FIG. 4 is a cross-sectional view of the casing structure depicted in FIG. 3 along a line I-I. With reference to FIG. 2 to FIG. 4, at least one side surface 122 (marked in FIG. 4) of the metal component 120A provided in this embodiment is covered by the plastic casing 110, and the casing structure 100 further includes a conductive layer 130, which is disposed on the metal component 120A and extends to the plastic casing 110, so that the metal component 120A and the conductive layer 130 collectively form a grounded structure occupying a large area. The electronic components of the electronic apparatus may be grounded to the metal component 120A to improve the EMC of the electronic apparatus.

For clear illustration, note that the conductive layer 130 is shown in FIG. 4 but not shown in FIG. 1 to FIG. 3. The distribution range of the conductive layer 130 may be shown as the range R depicted in FIG. 2, which should however not be construed as a limitation in the disclosure.

As described above, the plastic casing 110 is set to cover the side surface 122 of the metal component 120A, so that the metal component 120A and the plastic casing 110 are coplanar at the junction therebetween, whereby the conductive layer 130 may be protected from being broken due to the structural height difference at the junction of the metal component 120A and the plastic casing 110, so as to ensure that the metal component 120A may be reliably connected to the entire conductive layer 130 occupying a large area. In addition, under this configuration, it is not necessary to connect the metal component 120A to the conductive layer 130 by attaching a conductive tape, and thus it is possible to avoid the adhesion of the conductive tapes from being weak or inaccurate due to human errors.

Specifically, the metal component 120A is disposed on a surface 114 of the plastic casing 110, and the side surface 122 of the metal component 120A adjoins the surface 114 of the plastic casing 110 and is perpendicular to the surface 114 of the plastic casing 110. The plastic casing 110 has an extension wall 112 which extends from the surface 114 of the plastic casing 110 and covers the side surface 122 of the metal component 120A. At the junction of the metal component 120A and the plastic casing 110, a top surface 112a of the extension wall 112 adjoins and is level with a top surface 124 of the metal component 120A, and the top surface 112a and the top surface 124 are both covered by the conductive layer 130. In other words, the metal component 120A and the plastic casing 110 are coplanar at the junction between the top surface 112a and the top surface 124 which are level with each other.

Although the shape of the metal components 120B, 120C, and 120D is not exactly the same as that of the metal component 120A, the arrangement relationship between the metal components 120B, 120C, and 120D and the plastic casing 110 is similar to the arrangement relationship between the metal component 120A and the plastic casing 110, and thus no further explanation is provided below. In addition, in this embodiment, the metal component 120A as shown in FIG. 2 and FIG. 3 has a plurality of assembly holes H and a plurality of positioning posts P, which are configured to connect other components or casings. The metal components 120B, 120C, and 120D may also have similar assembly holes H and/or positioning posts P.

Figure 5:
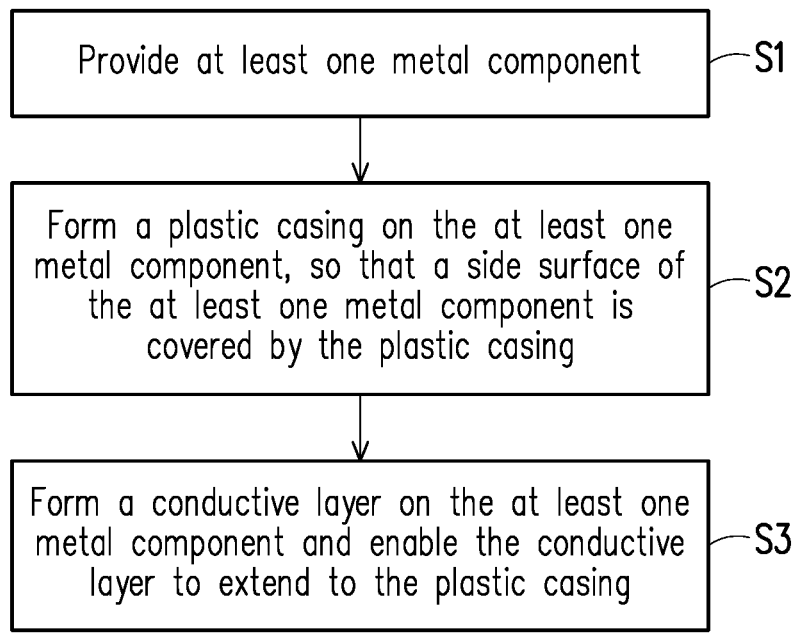
FIG. 5 is a flowchart of a manufacturing method of a casing structure according to an embodiment of the disclosure.

A manufacturing process of the casing structure 100 provided in this embodiment is explained by taking the metal component 120A as an example. FIG. 5 is a flowchart of a manufacturing method of a casing structure according to an embodiment of the disclosure. With reference to FIG. 5, in step S1, the metal component 120A shown in FIG. 1 is provided. In step S2, the plastic casing 110 shown in FIG. 1 to FIG. 4 is formed on the metal component 120A, so that the side surface 122 of the metal component 120A is covered by the plastic casing 110 as shown in FIG. 4. In step S3, the conductive layer 130 shown in FIG. 4 is formed on the metal component 120A, and the conductive layer 130 extends to the plastic casing 110.

Further, in step S2, the step of forming the plastic casing may include an in-mold injection process; namely, the metal component 120A is placed in a mold, and a plastic material is injected into the mold to form the plastic casing 110 on the metal component 120A, so that the side surface 122 of the metal component 120A may be well covered by the extension wall 112 of the plastic casing 110. In step S3, the step of forming the conductive layer 130 may include a spray and sputtering process, which should however not be construed as a limitation in the disclosure, and the conductive layer 130 may be formed by performing other appropriate processes.

Although the shape of the metal components 120B, 120C, and 120D is not exactly the same as that of the metal component 120A, the manufacturing process associated with the metal components 120B, 120C, and 120D is similar to the above-mentioned manufacturing process associated with the metal component 120A, and thus no further explanation is provided below.

To sum up, as provided above, in one or more embodiments of the disclosure, the plastic casing is set to cover the side surface of the metal component, so that the metal component and the plastic casing are coplanar at the junction therebetween, whereby the conductive layer may be protected from being broken at the junction of the metal component and the plastic casing due to the structural height difference. As such, the metal component may be reliably connected to the entire conductive layer occupying a large area. In addition, under this configuration, it is not necessary to connect the metal component to the conductive layer by attaching the conductive tape, and thus it is possible to avoid the adhesion of the conductive tapes from being weak or inaccurate due to human errors It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A casing structure, comprising:
    a plastic casing;
    at least one metal component, disposed on the plastic casing, wherein at least one side surface of the at least one metal component is covered by the plastic casing; and
    a conductive layer, disposed on the at least one metal component and extending to the plastic casing,
    wherein a top surface of the plastic casing and a top surface of the at least one metal component are coplanar and are covered by the conductive layer.

2. The casing structure according to claim 1, wherein the at least one metal component is disposed on a surface of the plastic casing, the at least one side surface of the at least one metal component adjoins the surface of the plastic casing, the plastic casing has at least one extension wall, and the at least one extension wall extends from the surface of the plastic casing and covers the at least one side surface of the at least one metal component.

3. The casing structure according to claim 2, wherein the at least one side surface of the at least one metal component is perpendicular to the surface of the plastic casing.

4. The casing structure according to claim 2, wherein the top surface of the at least one extension wall adjoins the top surface of the at least one metal component, and the top surface of the at least one extension wall is level with the top surface of the at least one metal component.

5. The casing structure according to claim 1, wherein the at least one metal component is located at a corner area of the plastic casing.

* * * * *